US012782792B2

(12) United States Patent
Wang et al.

(10) Patent No.: US 12,782,792 B2
(45) Date of Patent: Nov. 3, 2026

(54) LENS COVER FOR REDUCING FLARE-LIKE ARTIFACTS IN IMAGES

(71) Applicant: Black Sesame Technologies (Shenzhen) Co., Ltd., Shenzhen (CN)

(72) Inventors: Chao Wang, Shanghai (CN); Zhaowei Xin, Shanghai (CN)

(73) Assignee: Black Sesame Technologies (Shenzhen) Co., Ltd., Shenzhen (CN)

( * ) Notice: Subject to any disclaimer, the term of this patent is extended or adjusted under 35 U.S.C. 154(b) by 274 days.

(21) Appl. No.: 18/597,496

(22) Filed: Mar. 6, 2024

(65) Prior Publication Data

US 2025/0264775 A1 Aug. 21, 2025

(30) Foreign Application Priority Data

Feb. 21, 2024 (CN) ........................ 202410196051.X

(51) Int. Cl.
*G03B 11/04* (2021.01)

(52) U.S. Cl.
CPC .................................. *G03B 11/043* (2013.01)

(58) Field of Classification Search
CPC ...... G03B 11/043; G03B 11/00; H04N 23/55; H04N 23/51; H04N 23/73; H04N 23/75; H04N 23/81
See application file for complete search history.

(56) References Cited

U.S. PATENT DOCUMENTS

2020/0096838 A1* 3/2020 Kirchhoff ................. B60R 1/12
2020/0275004 A1* 8/2020 Condron ................... B60R 1/27

* cited by examiner

*Primary Examiner* — Euncha P Cherry
(74) *Attorney, Agent, or Firm* — Yao Legal Services, Inc.; Shun Yao

(57) ABSTRACT

Embodiments of this disclosure can provide a camera system. The camera system can include a lens system and a rotatable lens cover protecting the lens system from external environment. The rotatable lens cover can be configured to rotate about an optical axis of the lens system while the camera system is capturing images to reduce artifacts on the captured images caused by contaminants on the rotatable lens cover.

17 Claims, 6 Drawing Sheets

LENS COVER FOR REDUCING FLARE-LIKE ARTIFACTS IN IMAGES

RELATED APPLICATION

This application claims the benefit under 35 U.S.C. § 119(a) of the filing date of Chinese Patent Application No. 202410196051.X, filed in the Chinese Patent Office on Feb. 21, 2024. The disclosure of the foregoing application is herein incorporated by reference in its entirety.

BACKGROUND

Field

The disclosed embodiments generally relate to cameras in autonomous driving systems. More specifically, the disclosed embodiments relate to a rotatable lens cover to reduce flare-like artifacts in images captured by the cameras.

Related Art

On-vehicle cameras play an important role in autonomous driving. Most autonomous or self-driving vehicles use a combination of sensors to detect their surroundings, including cameras, radar, and lidar. The radar and lidar can be used to detect objects and measure speed/distance, and the cameras can be used to provide a high-resolution visual representation of the surroundings. Autonomous vehicles can have cameras placed on every side (e.g., the front, rear, left, and right) to obtain a 360° view of the environment surrounding the vehicle.

Unlike radar and lidar which can directly provide numeral data, cameras provide images that require processing (e.g., using machine learning-based image recognition technology) to convert images to numerical information. The quality of the images can affect the accuracy of the image recognition. For example, the autonomous driving system can recognize obstacles (e.g., pedestrians or other vehicles) based on images captured by the on-vehicle cameras. Poor quality images (e.g., images with flares) can reduce the image recognition accuracy.

SUMMARY

Embodiments of this disclosure can provide a camera system. The camera system can include a lens system and a rotatable lens cover protecting the lens system from external environment. The rotatable lens cover can be configured to rotate about an optical axis of the lens system while the camera system is capturing images to reduce artifacts on the captured images caused by contaminants on the rotatable lens cover.

In a variation on this embodiment, the camera system can include a gear system driving the rotatable lens cover.

In a further variation, the gear system can include a driving gear and a driven gear, and the rotatable lens cover is coupled to and rotates along with the driven gear.

In a further variation, the driving gear is rotating at a rate slower than a rotation rate of the driven gear.

In a variation on this embodiment, the camera system can include a motion controller configured to determine an exposure time of the camera system and configure the rotatable lens cover to rotate at a rate based on the determined exposure time.

In a further variation, the rotatable lens cover can be configured to rotate at a rate that is equal to or greater than an inverse of the exposure time.

In a further variation, the rotatable lens cover can be configured to rotate at a rate that is one or multiple times of an inverse of the exposure time.

In a further variation, the motion controller can be configured to determine whether the exposure time is greater than a threshold. In response to the exposure time being equal to or less than the threshold, the motion controller can configure a micro motor driving the rotation of the rotatable lens cover to operate in a high-speed mode. In response to the exposure time being greater than the threshold, the motion controller can configure the micro motor driving the rotation of the rotatable lens cover to operate in a low-speed mode.

In a further variation, the rotatable lens cover can be configured to rotate at a rate between 1800 and 30,000 revolutions per minute (RPM).

In a variation on this embodiment, the camera system can be used as an on-vehicle camera for autonomous driving.

One embodiment can provide a system and a method for reducing artifacts on images. During operation, the system can determine an exposure time of a camera, and a controller of the camera can configure a rotational speed of a rotatable lens cover of the camera based on the exposure time. The camera can capture images while the rotatable lens cover rotates, thereby reducing artifacts on the captured images caused by contaminants on the rotatable lens cover.

DESCRIPTION OF THE FIGURES

This present application is submitted with black-and-white photographs. In accordance with 37 C.F.R. § 1.84(a)(2), this Petition is submitted to request acceptance of the black-and-white photographs as the only practical medium by which aspects of the subject matter sought to be patented in this application may be accurately conveyed.

In the figures, like reference numerals refer to the same figure elements.

DETAILED DESCRIPTION

The following description is presented to enable any person skilled in the art to make and use the disclosed embodiments and is provided in the context of one or more particular applications and their requirements. Various modifications to the disclosed embodiments will be readily apparent to those skilled in the art, and the general principles defined herein may be applied to other embodiments and applications without departing from the scope of those that are disclosed. Thus, the present invention or inventions are not intended to be limited to the embodiments shown, but rather are to be accorded the widest scope consistent with the disclosure.

Overview

Embodiments of this disclosure provide a rotatable lens cover for on-vehicle cameras to remove flare-like artifacts in captured images. Microparticles or streaks of residues on a dirty lens or lens cover can often cause flare-like artifacts in captured images, which may significantly reduce the image quality. To efficiently reduce or remove such artifacts, in some embodiments, a camera can include a rotatable lens cover that is transparent and can protect the camera lens from weather elements. During the operation of the camera, the lens cover can rotate at a rate that is equal to or greater than the rate of exposure. In one embodiment, the rotatable lens cover can be coupled to a gear system driven by a micro motor.

Flare Reduction

Figure 1:
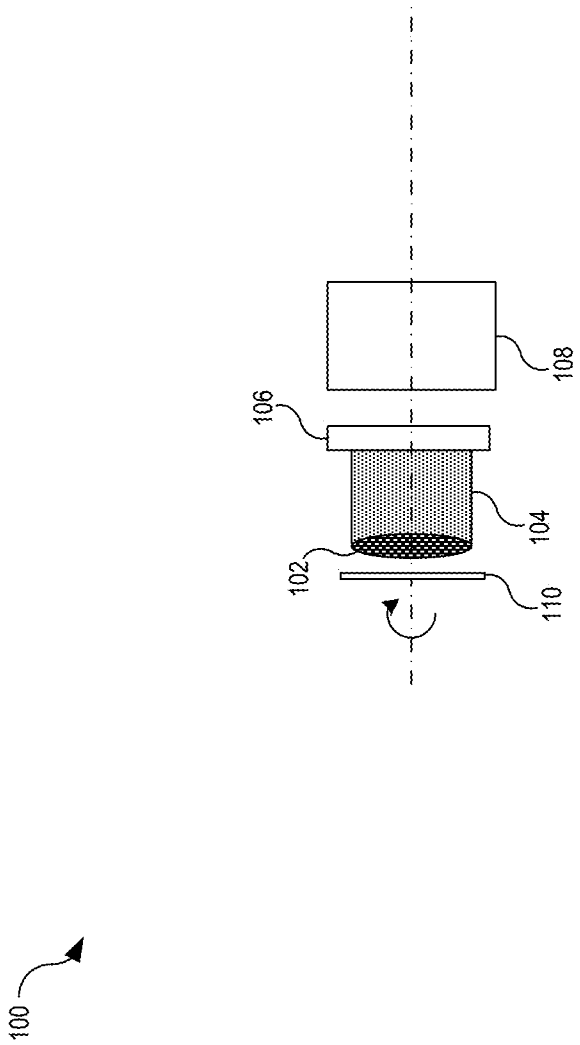
FIG. 1 illustrates a conceptual view of an exemplary camera system, according to one embodiment of the instant application.

FIG. 1 illustrates a conceptual view of an exemplary camera system, according to one embodiment of the instant application. In FIG. 1, camera system 100 can include a lens 102, a lens holder 104, a sensor array 106, an image signal processor (ISP) unit 108, and a protective cover 110.

Lens 102 can be any kind of lens that is suitable for the application, e.g., the autonomous driving application. In one example, lens 102 can have a wide viewing angle (e.g., above 60°). Lens holder 104 can provide a mounting place for lens 102. Lens holder 104 can optionally include a voice-coil motor (VCM) for moving the lens to achieve the optimum focus. Sensor array 106 can include a complementary metal-oxide-semiconductor (CMOS) array or a charge-coupled device (CCD) array. ISP unit 108 can include any type of image processor capable of processing images.

Although shown as a separate component in FIG. 1, in some embodiments, protective cover 110 can encompass the entire camera system (including lens 102, lens holder 104, sensor array 106, and ISP unit 108) to protect the internal components of the camera from environmental factors, such as water, dust, chemical corrosions, etc. Protective cover 110 can be made of a transparent material such as glass or plastic to allow transmission of light to sensor array 106 via lens 102. In one embodiment, protective cover 110 can be made of a transparent plastic material.

Protective cover 110 is in direct contact with the external environment. For autonomous driving applications, protective cover 110 is often exposed to various weather conditions (e.g., rain, snow, fog, etc.) and pollutants (e.g., dust) on the roads. Even in other applications (e.g., consumer products like smartphones or digital cameras) where the users are carefully protecting their devices from environmental factors, protective cover 110 may still be contaminated by dust, sweat or grease from the users' hands, etc. Certain well-intended cleaning actions, if not performed correctly, may also result in contamination of protective cover 110. For example, after a car wash, the user may use a wipe to wipe off water/soap on protective cover 110. However, if the wipe is not clean, this drying action may leave streaks of residuals on the surface of protective cover 110. These contaminations, either solid particles or liquid residues, can cause flare-like artifacts on images captured by the camera, thus degrading the quality of the images.

To reduce such unwanted artifacts, in some embodiments of the instant application, protective cover 110 can rotate about the optical axis of camera system 100, as indicated by the arrow in FIG. 1. In further embodiments, the rotational speed of protective cover 110 can be dynamically adjusted based on the shutter speed of camera system 100. More specifically, the rotational speed of protective cover 110 can be configured to be greater than the shutter speed.

Lens flares can happen when light (especially strong light) is scattered by material imperfections (e.g., pollutants) in the lens. In the optical system of a camera, there can be two types of flare: visible artifacts appearing in certain image regions and glare across the whole image. Both types of flare can reduce the quality of the captured images. More specifically, the glare can reduce the contrast and color saturation (e.g., adding light to dark image regions and adding white to saturated regions, thus reducing their saturation) of the images, and the visible artifacts (which can be in the form of circles, streaks, or spots of light) can create false contours in the images, which may degrade the detection, recognition, and understanding of the images. The rotatable lens cover can effectively reduce the visible artifacts caused by contamination of the lens cover.

Figure 2A:
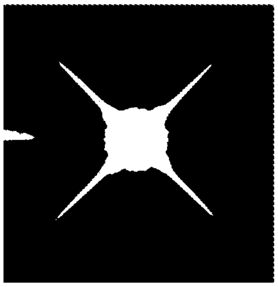
FIGS. 2A-2C illustrates exemplary flare-related artifacts in images.
Figure 2B:
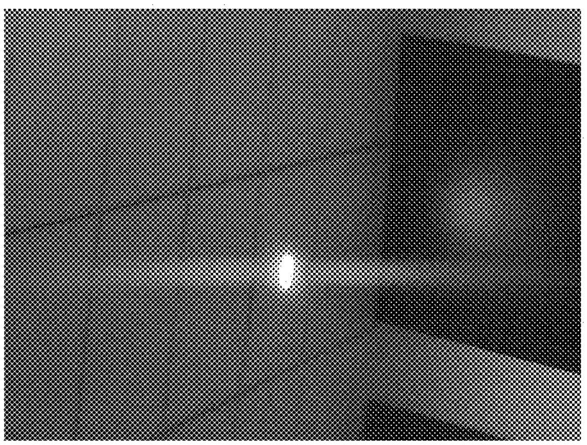
Figure 2C:
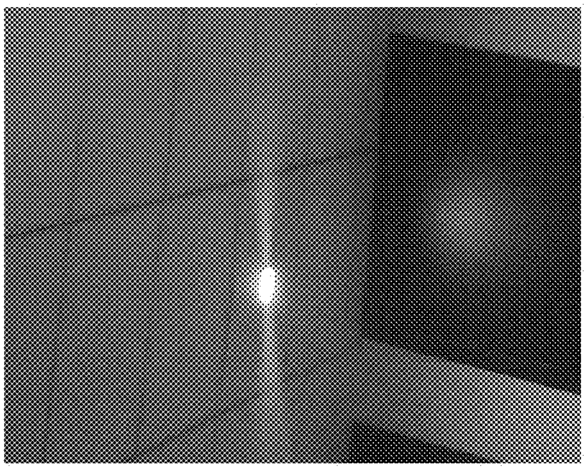

FIGS. 2A-2C illustrates exemplary flare-related artifacts in images. More specifically, FIG. 2A shows an example of visible artifacts caused by lens flares. The artifacts can have the shape of the aperture formed by the iris diaphragm (e.g., a square in this example) and are formed when light follows a pathway through the lens that contains one or more reflections from the lens surfaces.

FIG. 2B and FIG. 2C are examples of flare-like artifacts caused by pollutants on the surface of the lens or lens cover. When the lens cover of a camera is wiped (e.g., by hand, cloths, or some other materials), the unclean wiper may leave some pollutants on the surface of the lens cover, such as dust particles, liquid residues, sweat, grease, etc. If the lens cover is wiped in one direction (e.g., side-to-side or up-and-down), the surface pollutants (e.g., residuals) may form locally non-uniform stripes on the lens cover, which may essentially function as a diffraction grating. According to the theory of diffraction, the direction of the equivalent point spread function (PSF) is perpendicular to the direction of the stripes. In the example shown in FIG. 2B, the lens cover may be wiped horizontally from side to side, and light diffracted by the surface pollutants can create visible artifacts along the vertical direction. In the example shown in FIG. 2C, the lens cover may be wiped vertically, and light diffracted by the surface pollutants can create visible artifacts along the horizontal direction.

As can be seen from FIGS. 2A-2C, these visible artifacts can create false contours (e.g., in the form of light bands) in the captured images, and image-processing software may not be able to distinguish them from actual objects in the images, thus degrading the accuracy of object detection.

On-vehicle cameras often suffer from the negative effects caused by pollutants on their covers, as the vehicles often face hostile weather conditions (e.g., rain, fog, and snow) and road conditions (e.g., dusty or muddy roads). Consequently, the on-vehicle cameras often have to deal with dirty lens covers. For example, when pollutant-containing rainwater is air dried on the surface of the lens cover, due to gravity, the lens cover may be "masked" by (almost) vertical stripes of residues. In another example, a user may wipe the lens cover with the intention of making it clean, but such an action may leave invisible wiping traces. Due to the small size of the camera lens and lens cover (e.g., between three and ten millimeters), it can be hard to achieve a perfect clean surface on the lens cover. The unclean surface of the lens cover can result in flare-like artifacts similar to the ones shown in FIGS. 2B-2C. Such artifacts can be frequently observed in images captured by on-vehicle cameras.

Reducing or eliminating those undesired flare-like artifacts can be very important for autonomous driving applications because autonomous driving relies on images captured by on-vehicle cameras to learn the environment (e.g., to recognize obstacles), and inaccurate detection of objects in the images can hinder the ability for a vehicle to safely navigate in complex environments.

The time-invariant irradiance map of a scene can be denoted ir(x, y), and an ideal image of the scene (captured by a camera with a clean lens cover) can be expressed as an integration over the exposure time (i.e., T) of the camera sensor:

$$Ir(x, y) = \int_0^T ir(x, y, t)dt = \int_0^T ir(x, y)dt = T \cdot ir(x, y). \quad (1)$$

One can model the diffraction artifacts formed by the grating-like pollutant particles or residues using a convolution kernel $K_s(x, y)$, which can be expressed as the integral of the diffraction density kernel $k_s(x, y, t)$, i.e., $$K_s(x, y) = \int_0^T k_s(x, y, t)dt.$$

Considering a fixed (or static) diffraction (i.e., the grating structure does not change over time, and $k_s(x, y, t)=k_s(x, y)$), the formula for the convolutional kernel can be simplified as $K_s(x, y)=T \cdot k_s(x, y)$. To satisfy the conservative property, $K_s(x, y)$ can be normalized as:

$$\int_{(x,y)\in\Omega} K_s(x, y)d\Omega = 1. \quad (2)$$

Accordingly, the captured image can be expressed using:

$$\begin{aligned} Ir(x, y) &= \int_0^T ir(x, y, t) * k_s(x, y, t)dt \\ &= \int_0^T ir(x, y) * k_s(x, y)dt \\ &= T \cdot (ir * k_s)(x, y) \\ &= (ir * K_s)(x, y) \end{aligned} \quad (3)$$

As discussed previously, the structure of both the diffraction density kernel $k_s(x, y)$ and the diffraction kernel $K_s(x, y)$ of the surface contamination resulting from an unclean wiping operation can be very thin and is generally perpendicular to the wiping direction.

Considering a time-varying diffraction (i.e., $k_v(x, y, t)$ is a function of time), the convolution kernel can be denoted $$K_v(x, y) = \int_0^T k_v(x, y, t)dt.$$

In a special case where the contaminated lens cover (hence the grating structure) rotates about the optical axis of the camera, the diffraction density kernel can be written as: $k_v(x, y, t)=k_v(x \cos \omega t - y \sin \omega t, x \cos \omega t + y \sin \omega t, 0)$, where $\omega$ is the angular speed. One can express the convolution kernel using polar coordinates:

$$K_v(r, \theta) = \int_0^T k_v(r, \theta, t)dt = \frac{1}{\omega}\int_0^{\omega T} k_v(r, \theta + \delta, 0)d\delta. \quad (4)$$

The above Equation (4) demonstrates that the convolution kernel of the rotating grating can be equivalent to averaging the initial diffraction density kernel $k_v(x, y, 0)$ over the ISO-radius direction across the rotation angle. It can be shown that the density kernels at different time instances can be the rotations of the initial density kernel. As a result of the integration in Equation (4), the main peak of the diffraction density kernel can be preserved, whereas the side peaks of the density kernel will be averaged over a relatively large range. Considering that the side peaks are generally far smaller than the main peak, the flare-like artifacts can be efficiently reduced.

In some embodiments of the instant application, to reduce the flare-like artifacts caused by contaminants on the lens cover, the lens cover can rotate about its optical axis. More specifically, to ensure the continuity of the convolution kernel $K_v(x, y)$ or $K_v(r, \theta)$, the lens cover should rotate at a speed greater than 1/T, where T is the exposure time. In further embodiments, the angular speed $\omega$ of the lens cover can be $$\omega = \frac{2P\pi}{T},$$

where P can be any positive integer.

In a typical autonomous driving scenario, the on-vehicle camera may operate with a frame rate of 30 FPS, meaning that the exposure time can be less than 1/30 seconds or 33 milliseconds. In some examples, depending on the lighting condition, the exposure time can be between 2 and 33 milliseconds. Accordingly, the angular speed of the lens cover can be between 60 πP and 1000 πPrad/s. Hence, assuming P=1, the rotational speed of the lens cover can be between 1800 and 30,000 revolutions per minute (RPM) or between 30 and 500 Hz. If the frame rate of the camera increases, the rotational speed of the lens cover should increase as well to effectively reduce the flare-like artifacts.

Rotatable Lens Cover

As discussed previously, the minimum rotational speed of the lens cover can be determined based on the camera's exposure time. In some embodiments, the rotational speed can be fixed to a value that is determined based on the minimum exposure time. For example, if the minimum exposure time is two milliseconds, the lens cover can be configured to rotate at 30,000 RPM. This way, regardless of the lighting condition, the lens cover can always rotate at a speed that can be sufficient for flare reduction. In alternative embodiments, the rotational speed can vary according to the exposure time. For example, a controller can adjust the rotational speed of the lens cover based on the instant ISO setting of the camera. When the exposure time is longer, the controller can reduce the rotational speed of the lens cover; when the exposure time is shorter, the controller can increase the rotational speed.

Figure 3:
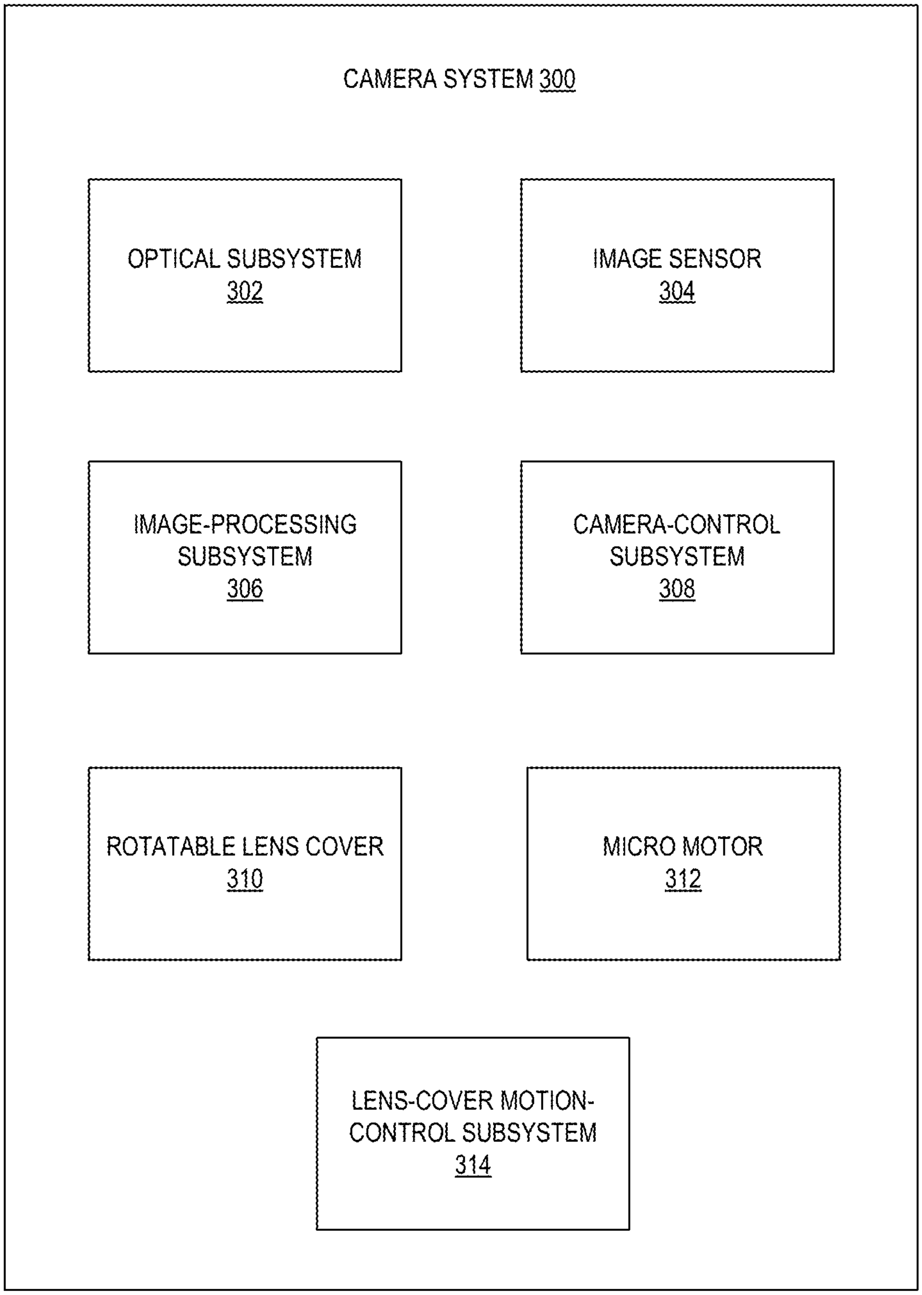
FIG. 3 illustrates an exemplary block diagram of a camera system, according to one embodiment of the instant application.

FIG. 3 illustrates an exemplary block diagram of a camera system, according to one embodiment of the instant application. Camera system 300 can include an optical subsystem 302, an image sensor 304, an image-processing subsystem 306, a camera-control subsystem 308, a rotatable lens cover 310, a micro motor 312, and a lens-cover motion-control subsystem 314.

Optical subsystem 302 can include the optical components of a camera, such as lenses, mirrors, prisms, shutter or iris diaphragm, etc. Optical subsystem 302 can collect and focus the light onto image sensor 304. Image-processing subsystem 306 can be responsible for converting the output of image sensor 304 into digital images. Camera-control subsystem 308 can be responsible for controlling the operation of optical subsystem 302. For example, depending on the user input or certain user-defined algorithms, camera-control subsystem 308 can adjust the shutter speed or exposure time. In one example, camera-control subsystem 308 can detect the lighting condition and adjust the exposure time accordingly.

Rotatable lens cover 310 can include a transparent cover for protecting optical subsystem 302 from the outside environment. In some embodiments, rotatable lens cover 310 can be a standalone component positioned over the camera lens. In alternative embodiments, rotatable lens cover 310 can be part of a protective cover of the entire camera system. In one example, the protective cover can enclose the entire camera system. Rotatable lens cover 310 can be configured to rotate about the optical axis of optical subsystem 302. Various motion-driving mechanisms can be used to drive the rotation of rotatable lens cover 310. In one embodiment, a gear system can be used to drive the rotation of rotatable lens cover 310. The scope of this application is not limited by the mechanism used to drive the rotation. Micro motor 312 can be a compact and lightweight motor for driving rotatable lens cover 310. Micro motor 312 can include an alternating current (AC) or direct current (DC) motor.

Lens-cover motion-control subsystem 314 can be responsible for controlling the motion of rotatable lens cover 310. In some embodiments, lens-cover motion-control subsystem 314 may communicate with optical subsystem 302 to obtain information associated with the instant exposure time of image sensor 304. Accordingly, lens-cover motion-control subsystem 314 can configure the speed of micro motor 312 such that rotatable lens cover 310 can rotate at a desired speed. For example, if the exposure time is relatively short due to bright lighting, lens-cover motion-control subsystem 314 can configure micro motor 312 to operate a high speed; if the exposure time is relatively long due to dim lighting, lens-cover motion-control subsystem 314 can configure micro motor 312 to operate a low speed. In some embodiments, the rotational speed of the lens cover can be between 1800 and 30,000 RPM. In one embodiment, the rotational speed of rotatable lens cover 310 can be adjusted continuously based on the exposure time. In an alternative embodiment, the rotational speed of rotatable lens cover 310 can be adjusted in a discrete fashion.

Figure 4:
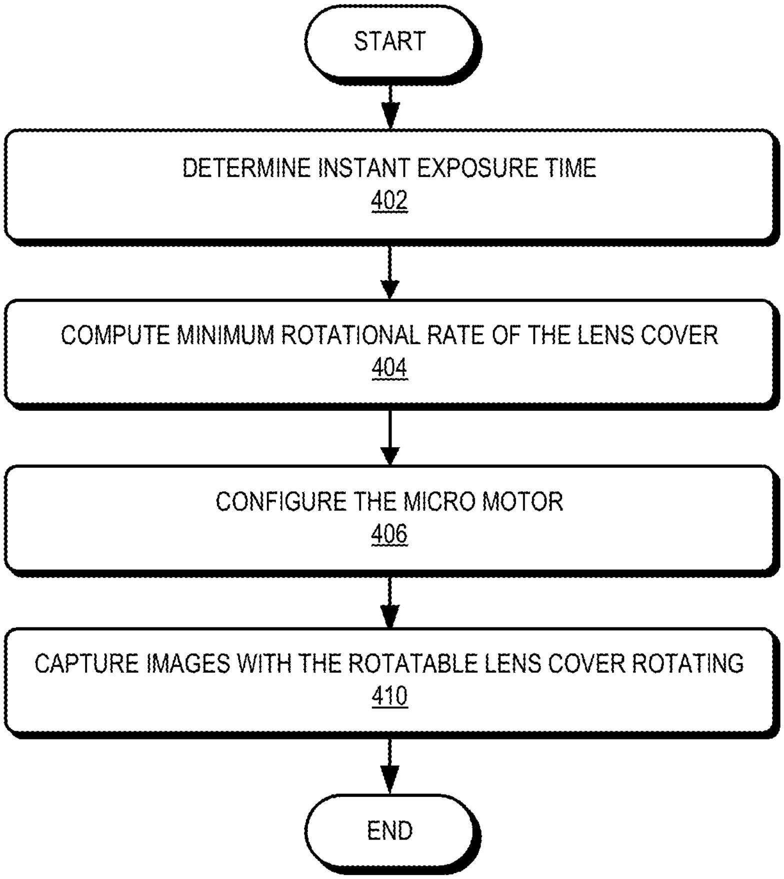
FIG. 4 presents a flowchart illustrating an exemplary operating process of a camera system with a rotatable lens cover, according to one embodiment of the instant application.

FIG. 4 presents a flowchart illustrating an exemplary operating process of a camera system with a rotatable lens cover, according to one embodiment of the instant application. In one or more embodiments, one or more of the steps in FIG. 4 may be repeated and/or performed in a different order. Accordingly, the specific arrangement of steps shown in FIG. 4 should not be construed as limiting the scope of the technique.

During operation, the motion controller can determine the instant exposure time of the camera (operation 402). The instant exposure time can be user-configured (e.g., by manually setting the ISO) or set automatically by the camera controller. In one embodiment, the motion controller can communicate with the camera controller to obtain the instant ISO setting.

Based on the exposure time, the motion controller can compute the minimum rotational rate of the lens cover (operation 404). Note that the frequency of rotation of the lens cover should be greater than 1/T, where T is the exposure time to effectively reduce the flare-like artifacts in images caused by contaminants on the lens cover. In some embodiments, the frequency or rate of the rotation can be one or multiple times the rate of the exposure (i.e., the inverse of the exposure time). In one example, the instant exposure time can be 10 milliseconds, and the frequency or rate of the rotation can be 100 Hz, 200 Hz, etc.

The motion controller can then configure the micro motor driving the rotatable lens cover according to the determined minimum rate (operation 406). In one embodiment, the motion controller can configure the micro motor to drive the rotatable lens cover at the minimum rate. In another embodiment, the micro motor can be configured to operate in two modes, a high-speed mode and a low-speed mode. If the motion controller determines that the minimum rate is equal to or greater than a threshold (e.g., the camera exposure time is equal to or less than a threshold exposure time), it can configure the micro motor to operate in the high-speed mode. Otherwise, the micro motor can be configured to operate in the low-speed mode.

The camera can then capture images with the rotatable lens cover rotating (operation 410). With the rotation of the lens cover, the flare effect caused by the grating-like contaminants can be averaged out, thus improving the image recognition accuracy. Note that for the application of autonomous driving, the cameras are required to capture images continuously. Accordingly, the process shown in FIG. 4 can be performed dynamically, where the motion controller can continuously monitor the exposure time and adjust the speed or operation mode of the micro motor accordingly.

The simplest way to rotate a disk-like object such as the lens cover can include attaching a post or axis to its center and then rotating the post (e.g., by a motor). However, the lens cover of a camera is generally aligned to the image sensor with their axes being concentric, meaning that it is impractical to attach a post/axis to the center of the lens cover. In some embodiments, a gear system can be used to drive the rotation of the lens cover.

Figure 5:
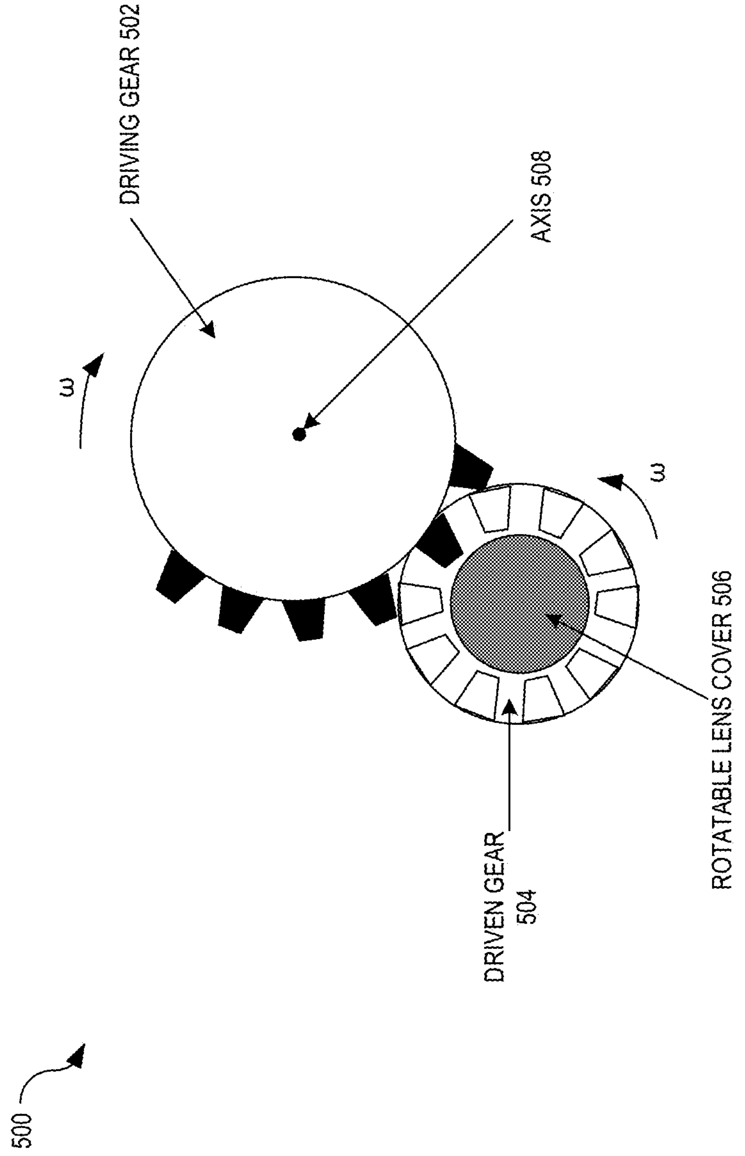
FIG. 5 illustrates an exemplary gear system driving the rotatable lens cover, according to one embodiment of the instant application.

FIG. 5 illustrates an exemplary gear system driving the rotatable lens cover, according to one embodiment of the instant application. A gear system 500 can include a driving gear 502 and a driven gear 504. In this example, driving gear 502 and driven gear 504 can have matching teeth such that when driving gear 502 rotates about its axis 508, the teeth of driving gear 502 can push against the teeth of driven gear 504, causing driven gear 504 to rotate. In one example, axis 508 of driving gear 502 can be driven by a motor.

FIG. 5 also shows that rotatable lens cover 506 is mounted on and concentric with driven gear 504 such that it rotates along with driven gear 504. Depending on the design, the gear ratio can vary. In one example, the gear ratio can be less than one such that the driving gear may rotate at a slower rate than the driven gear. This also means that the motor can rotate at a slower rate than the lens cover, thus reducing vibrations caused by the motor.

In the example shown in FIG. 5, the gear ratio is fixed. In alternative embodiments, the gear ratio can be variable. In addition to the external gears shown in FIG. 5, a gear system used to drive the rotation of the lens cover may also include internal gears. For example, the driving and driven gear can be concentric, with the driving gear surrounding the driven gear.

Figure 6:
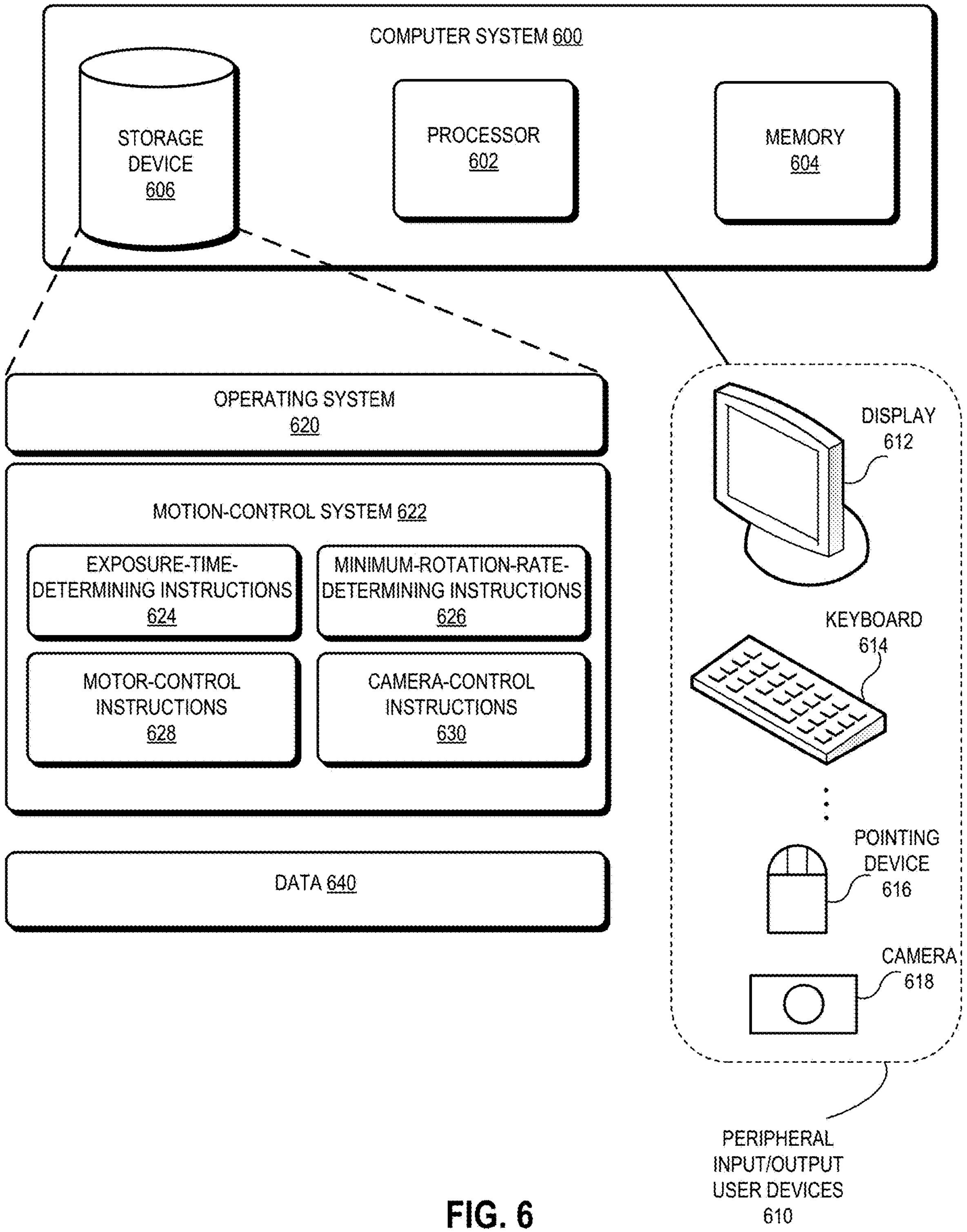
FIG. 6 illustrates an exemplary computer system that facilitates the operation of the motion controller, according to one embodiment of the instant application.

FIG. 6 illustrates an exemplary computer system that facilitates the operation of the motion controller, according to one embodiment of the instant application. Computer system 600 includes a processor 602, a memory 604, and a storage device 606. Furthermore, computer system 600 can be coupled to peripheral input/output (I/O) user devices 610, e.g., a display device 612, a keyboard 614, a pointing device 616, and a camera 618. Storage device 606 can store an operating system 620, a motion-control system 622, and data 640. In some embodiments, computer system 600 can be implemented as part of the autonomous driving control system on a vehicle.

Motion-control system 622 can include instructions, which when executed by computer system 600, can cause computer system 600 or processor 602 to perform methods and/or processes described in this disclosure. Specifically, motion-control system 622 can include instructions for determining the exposure time of the camera (exposure-time-determining instructions 624), instructions for determining the minimum rotation rate of the lens cover (minimum-rotation-rate-determining instructions 626), instructions for controlling the micro motor to drive the rotation of the lens cover (motor-control instructions 628), and instructions for controlling the camera to capture images while the lens cover is rotating (camera-control instructions 630).

This disclosure presents a solution to the problem of flare-like artifacts in images resulting from an unclean lens cover of a camera. By rotating the lens cover during the exposure time, the convolution kernel corresponding to the grating-like structure formed by the surface contaminants can be averaged over the total rotational angle, thus reducing the flare effect. If the lens cover rotates at a sufficiently large rate (e.g., being greater than the inverse of the exposure time), the flare-like artifacts can be effectively reduced. In some embodiments, a motion controller can be used to dynamically adjust the rotation rate of the lens cover based on the exposure time. In alternative embodiments, the rotation rate can be a fixed rate that is equal to or greater than the inverse of the minimum exposure time of the camera. In some embodiments, the camera can include a gear system, and the motion controller can control a micro motor coupled to the driving gear of the gear system. The lens cover can be coupled to the driven gear such that it rotates along with the driven gear. In a further embodiment, the gear ratio can be less than one such that the driving gear may rotate at a slower rate than the driven gear. This solution is ideal for on-vehicle cameras, as the on-vehicle cameras are less power-constrained compared with handheld cameras. Moreover, the on-vehicle cameras are prone to having their lens cover contaminated.

Data structures and program code described in this detailed description are typically stored on a non-transitory computer-readable storage medium, which may be any device or medium that can store code and/or data for use by a computer system. Non-transitory computer-readable storage media include, but are not limited to, volatile memory; non-volatile memory; electrical, magnetic, and optical storage devices, solid-state drives, and/or other non-transitory computer-readable media now known or later developed.

Methods and processes described in the detailed description can be embodied as code and/or data, which may be stored in a non-transitory computer-readable storage medium as described above. When a processor or computer system reads and executes the code and manipulates the data stored on the medium, the processor or computer system performs the methods and processes embodied as code and data structures and stored within the medium.

Furthermore, the optimized parameters from the methods and processes may be programmed into hardware modules such as, but not limited to, application-specific integrated circuit (ASIC) chips, field-programmable gate arrays (FPGAs), and other programmable-logic devices now known or hereafter developed. When such a hardware module is activated, it performs the methods and processes included within the module.

The foregoing embodiments have been presented for purposes of illustration and description only. They are not intended to be exhaustive or to limit this disclosure to the forms disclosed. Accordingly, many modifications and variations will be apparent to practitioners skilled in the art. The scope is defined by the appended claims, not the preceding disclosure.

What is claimed is:

1. A camera system, comprising:

a lens system;

a rotatable lens cover protecting the lens system from external environment;

wherein the camera system is to obtain a current exposure time and configure the rotatable lens to rotate, while the camera system is capturing images, about an optical axis of the lens system at a rate that is equal to or greater than an inverse of the current exposure time, thereby reducing artifacts on the captured images caused by contaminants on the rotatable lens cover.

2. The camera system of claim 1, further comprising a gear system driving the rotatable lens cover.

3. The camera system of claim 2, wherein the gear system comprises a driving gear and a driven gear, and wherein the rotatable lens cover is coupled to and rotates along with the driven gear.

4. The camera system of claim 3, wherein the driving gear is rotating at a rate slower than a rotation rate of the driven gear.

5. The camera system of claim 1, further comprising a motion controller configured to:

determine an exposure time of the camera system; and configure the rotatable lens cover to rotate at a rate based on the determined exposure time.

6. The camera system of claim 1, wherein the rotatable lens cover is configured to rotate at a rate that is one or multiple times an inverse of the exposure time.

7. The camera system of claim 1, wherein the camera system is configured to:

determine whether the exposure time is greater than a threshold;

in response to the exposure time being equal to or less than the threshold, configure a micro motor driving the rotation of the rotatable lens cover to operate in a high-speed mode; and in response to the exposure time being greater than the threshold, configure the micro motor driving the rotation of the rotatable lens cover to operate in a low-speed mode.

8. The camera system of claim 1, wherein the rotatable lens cover is configured to rotate at a rate between 1800 and 30,000 revolutions per minute (RPM).

9. The camera system of claim 1, wherein the camera system is used as an on-vehicle camera for autonomous driving.

10. A computer implemented method, comprising:

determining an exposure time of a camera;

configuring, by a controller of the camera, a rotational speed of a rotatable lens cover of the camera based on the exposure time, wherein configuring the rotational speed of the rotatable lens cover comprises configuring the rotatable lens cover to rotate at a rate that is equal to or greater than an inverse of the exposure time; and capturing images while the rotatable lens cover rotates, thereby reducing artifacts on the captured images caused by contaminants on the rotatable lens cover.

11. The method of claim 10, wherein configuring the rotational speed of the rotatable lens cover comprises configuring a gear system driving the rotatable lens cover.

12. The method of claim 11, wherein the gear system comprises a driving gear and a driven gear, and wherein the rotatable lens cover is coupled to and rotates along with the driven gear.

13. The method of claim 12, wherein the driving gear is rotating at a rate slower than a rotation rate of the driven gear.

14. The method of claim 10, wherein configuring the rotational speed of the rotatable lens cover comprises configuring the rotatable lens cover to rotate at a rate that is one or multiple times an inverse of the exposure time.

15. The method of claim 10, wherein configuring the rotational speed of the rotatable lens cover comprises:

determining whether the exposure time is greater than a threshold;

in response to the exposure time being equal to or less than the threshold, configuring a micro motor driving the rotation of the rotatable lens cover to operate in a high-speed mode; and in response to the exposure time being greater than the threshold, configuring the micro motor driving the rotation of the rotatable lens cover to operate in a low-speed mode.

16. The method of claim 10, wherein configuring the rotational speed of the rotatable lens cover comprises configuring the rotatable lens cover to rotate at a rate between 1800 and 30,000 revolutions per minute (RPM).

17. The method of claim 10, wherein the camera system is used as an on-vehicle camera for autonomous driving.

* * * * *